(12) United States Patent
Robertson et al.

(10) Patent No.: US 12,110,744 B2
(45) Date of Patent: Oct. 8, 2024

(54) PRECIPITATE-STRENGTHENED HARD METAL-DIAMOND COMPOSITE

(71) Applicant: Baker Hughes Oilfield Operations LLC, Houston, TX (US)

(72) Inventors: Andrew Robertson, The Woodlands, TX (US); Marc Bird, Houston, TX (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 470 days.

(21) Appl. No.: 17/348,684

(22) Filed: Jun. 15, 2021

(65) Prior Publication Data
US 2022/0397005 A1 Dec. 15, 2022

(51) Int. Cl.
*E21B 10/50* (2006.01)
*C04B 35/56* (2006.01)

(52) U.S. Cl.
CPC .......... *E21B 10/50* (2013.01); *C04B 35/5626* (2013.01); *C04B 2235/404* (2013.01); *C04B 2235/405* (2013.01); *C04B 2235/427* (2013.01); *C04B 2235/762* (2013.01); *C04B 2235/80* (2013.01)

(58) Field of Classification Search
CPC .............................. E21B 10/46; E21B 10/567
See application file for complete search history.

(56) References Cited

U.S. PATENT DOCUMENTS

| | | | |
|---|---|---|---|
| 4,604,106 A * | 8/1986 | Hall | F16C 33/043 |
| | | | 51/293 |
| 6,908,688 B1 * | 6/2005 | Majagi | E21B 10/567 |
| | | | 428/565 |
| 2013/0092451 A1 | 4/2013 | Mukhopadhyay et al. | |
| 2015/0218056 A1 | 8/2015 | Andersin et al. | |
| 2019/0085641 A1 * | 3/2019 | Heaton | B24D 3/348 |
| 2019/0345589 A1 * | 11/2019 | Konyashin | B22F 3/24 |

FOREIGN PATENT DOCUMENTS

| | | |
|---|---|---|
| JP | 1996-109431 A | 4/1996 |
| KR | 10-2019-0131488 A | 11/2019 |
| KR | 10-2019-0134242 A | 12/2019 |

OTHER PUBLICATIONS

International Search Report for International Application No. PCT/US2022/072043 dated Aug. 17, 2022, 4 pages.
International Written Opinion for International Application No. PCT/US2022/072043 dated Aug. 17, 2022, 4 pages.

* cited by examiner

*Primary Examiner* — Cathleen R Hutchins
(74) *Attorney, Agent, or Firm* — Baker Hughes Company

(57) ABSTRACT

A cutting table for a cutting element, including: a diamond phase; a tungsten carbide phase; a cobalt-tungsten metallic phase; and an intermetallic phase comprising $Co_3WC_x$, where $0 \leq x \leq 1$. Also disclosed is a method of manufacturing a cutting element, the method including: sintering diamond and tungsten carbide particles in the presence of Co and W to about 1520° C. or greater under pressure of about 57 kbar or greater to form a hard metal-diamond composite compact and solubilize carbon and tungsten within the compact; cooling the cutting element at about 1° C./sec or greater; and subsequent to cooling the cutting element, heat-treating the cutting element to precipitate carbon and tungsten in the compact as an intermetallic phase.

20 Claims, 5 Drawing Sheets

PRECIPITATE-STRENGTHENED HARD METAL-DIAMOND COMPOSITE

TECHNICAL FIELD

Embodiments of the present invention relate generally to methods of forming polycrystalline tables, methods of forming polycrystalline elements, and related structures. The described polycrystalline tables have precipitated $Co_3WC_x$, where $0 \leq x \leq 1$, as an intermetallic phase in the metal binder. The precipitated intermetallic phase increases the toughness of the described polycrystalline tables.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements, known in the art as "inserts," may be mounted to each cone of the drill bit.

The cutting elements used in such earth-boring tools often include polycrystalline diamond compact (often referred to as "PDC") cutting elements, also termed "cutters," which are cutting elements that include a polycrystalline diamond (PCD) material, which may be characterized as a superabrasive or superhard material. Such polycrystalline diamond materials are formed by sintering and bonding together relatively small synthetic, natural, or a combination of synthetic and natural diamond grains or crystals, termed "grit," under conditions of high temperature and high pressure in the presence of a catalyst, such as, for example, cobalt, iron, nickel, or alloys and mixtures thereof, to form a region of polycrystalline diamond material, also called a diamond table. These processes are often referred to as high temperature/high pressure ("HTHP") or alternately high pressure/high temperature ("HPHT") processes. The cutting element substrate may comprise a cermet material, i.e., a ceramic-metal composite material, such as, for example, cobalt-cemented tungsten carbide. In some instances, the polycrystalline diamond table may be formed on the cutting element, for example, during the HTHP sintering process. In such instances, cobalt or other catalyst material in the cutting element substrate may be swept into the diamond grains or crystals during sintering and serve as a catalyst material for forming a diamond table from the diamond grains or crystals. Powdered catalyst material may also be mixed with the diamond grains or crystals prior to sintering the grains or crystals together in an HTHP process.

BRIEF SUMMARY

This summary does not identify key features or essential features of the claimed subject matter, nor does it limit the scope of the claimed subject matter.

Accordingly, in some embodiments, A cutting table for a cutting element, including: a diamond phase; a tungsten carbide phase; a cobalt-tungsten metallic phase; and an intermetallic phase comprising $Co_3WC_x$, where $0 \leq x \leq 1$.

Accordingly, in some embodiments, A method of manufacturing a cutting element, the method including: sintering diamond and tungsten carbide particles in the presence of Co and W to about 1520° C. or greater under pressure of about 57 kbar or greater to form a hard metal-diamond composite compact and solubilize carbon and tungsten within the compact; cooling the cutting element at about 1° C./sec or greater; and subsequent to cooling the cutting element, heat-treating the cutting element to precipitate carbon and tungsten in the compact as an intermetallic phase.

In some embodiments, A method of forming a cutting table of a cutting element including: sintering diamond and tungsten carbide particles in the presence of cobalt and tungsten to about 1520° C. or greater under about 57 kbar to about 70 kbar of pressure to form a hard metal-diamond composite compact and solubilize carbon and tungsten between diamond and tungsten carbide particles of the compact; cooling the cutting element at about 5° C./sec or greater; and subsequent to cooling the cutting element, heat-treating the cutting element to precipitate carbon and tungsten as an intermetallic phase between diamond and tungsten carbide particles of the compact, wherein the heat-treating is performed at 600 to 800° C. for at least 10 minutes.

BRIEF DESCRIPTION OF THE DRAWINGS

The illustrations presented in this disclosure are not meant to be actual views of any particular cutting element, microstructure for a material, earth-boring tool, or component thereof, but are merely idealized representations employed to describe illustrative embodiments. Thus, the drawings are not necessarily to scale.

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
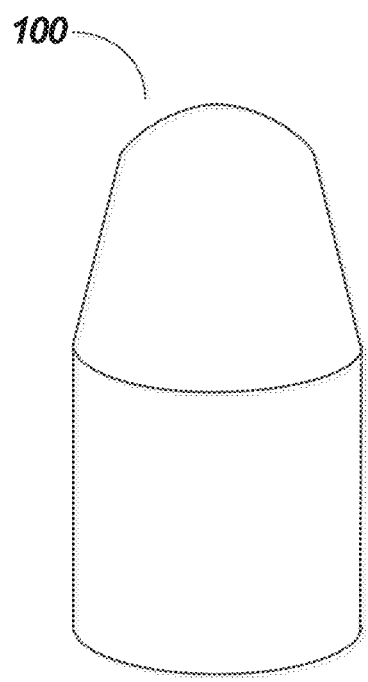
FIG. 1 shows an example of a cutter consistent with the present disclosure.

Any headings used herein should not be considered to limit the scope of embodiments of the invention as defined by the claims below and their legal equivalents. Concepts described in any specific heading are generally applicable in other sections throughout the entire specification.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, the terms "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art.

As used herein, the term "superabrasive material" means and includes any material having a Knoop hardness value of about 3,000 Kgf/mm$^2$ (29,420 MPa) or more. Superabrasive materials include, for example, diamond and cubic boron nitride. Superabrasive materials may also be characterized as "superhard" materials.

As used herein, terms of relative positioning, such as "above," "over," "under," and the like, refer to the orientation and positioning shown in the figures. During real-world formation and use, the structures depicted may take on other orientations (e.g., may be inverted vertically, rotated about any axis, etc.). Accordingly, the descriptions of relative positioning must be reinterpreted in light of such differences in orientation (e.g., resulting in the positioning structures described as being located "above" other structures underneath or to the side of such other structures as a result of reorientation).

This disclosure describes a precipitate-strengthened hard metal (e.g., WC—Co) diamond composite material. The material is synthesized via high pressure-high temperature (HPHT) methods whereby a fast quench (e.g., about 1° C./sec or more) after sintering yields a substantial amount of tungsten and/or carbon retained in solid solution in the metallic cobalt binder phase(s). Post-synthesis heat-treatment precipitates Co—W—C intermetallic phase(s) in the metallic cobalt binder phase(s) leading to substantial improvement in composite fracture toughness and negligible change in abrasion resistance. The material properties are uniquely suited for applications, such as shaped compacts, requiring moderate-high fracture toughness and high abrasion resistance and are an improvement over other hard metal and hard metal-diamond composites.

The described hard metal-diamond composites use high temperatures (e.g., 1520° C. or greater) and fast cooling rates (e.g., at least about 1° C./sec) during and after a HPHT sintering process to drive more tungsten into solid solution than is achievable in other hard metal synthesis. The additional tungsten in solid solution enables the use of a post-synthesis heat-treatment to substantially improve fracture toughness via the precipitation of Co—W—C intermetallic phase(s).

FIG. 1 shows an example of a cutter (100) consistent with the present disclosure. The described material has a unique combination of material properties allowing it to be used in shaped compact form (e.g., as an insert) in roller cone and roller cone-PDC hybrid drill bits for particularly challenging hard and abrasive drilling applications requiring high fracture toughness and high abrasion resistance. While suitable for roller cone bits, the material is also useful for other earth-boring tools. Conventional hard metals and hard metal-diamond composite compacts suffer from being either not abrasion resistant enough and/or not tough enough to perform well. They accordingly fail prematurely via excessive wear and/or gross cracking. It is known to the inventors to circumvent this excess wear and/or gross cracking by the use of blunter compact (i.e., cutter) shapes. However, blunter compact shapes produce slower drilling rates (i.e., rate of penetration).

In contrast, the described compact material possesses both moderate-high fracture toughness and high abrasion resistance enabling high performance compacts for challenging hard and abrasive drilling applications. The enhanced material properties can prolong compact life as well as enable the use of sharper compact cutting edge shapes to promote faster drilling. Accordingly, the present material may enable higher drilling performance without compromising on compact life.

Samples of three different compositions of hard metal-diamond composite compacts consistent with this disclosure were heat-treated at 700° C. for 1 hour and tested for fracture toughness and abrasion resistance. Comparison of the heat-treated condition to the as-received condition of the compacts showed a negligible change in abrasion resistance. However, fracture toughness improved by 1 to 2.5 MPa*m^½ depending on the heat-treated sample.

The following provides a theoretical basis, supported by thermodynamic modelling, for the observed behavior. HPHT processing to form a compact at about 57 kilobar (kbar) or greater pressure maintains a diamond structure during liquid phase sintering. The temperatures required for optimum diamond sintering are typically 1450° C. to 1480° C. This temperature is similar to temperatures used in atmospheric sintering of cemented tungsten carbide. From thermodynamic modelling, increasing the sintering temperature from 1480° C. to 1520° C. (atmospheric processing to diamond stable processing-HPHT) increases the W and C dissolution in the liquid phase by 0.05-0.1 wt. % of W and 0.003-0.008 wt. % of C, respectively. Coupling the quenching during HPHT sintering and the increase in dissolved W and C renders a metastable structure capable of precipitating coherent precipitates that improve strength and toughness of hard metal-diamond composites. In a non-limiting example, the precipitates constitute between about 2% and about 10% by volume of the interstitial spaces between the diamond and tungsten carbide particles.

A compact cutting table of a cutter, includes a diamond phase; a tungsten carbide phase; a cobalt-tungsten metallic phase; and an intermetallic phase including $Co_3WC_x$, where $0 \leq x \leq 1$. The cutting table of the cutter has an intermetallic phase which results in increased toughness of the compact. This increased toughness allows for additional shapes of the compact. For example, the cutter may be configured as an insert tip for a roller cone bit. In another example, the cutter may be employed as an insert for a roller cone-PDC hybrid drill bit. The shape of the cutter may allow faster drilling rates compared with flatter cutters.

The cutting table may have a variety of cobalt concentrations. In an example, the cutting table has at least 5 wt. % cobalt in the metallic phase. In some examples, the cutting table has at least 8 wt. % cobalt in the metallic phase. The cutting table may be between about 3 wt. % and about 15 wt. % cobalt. The cutting table may be between about 5 wt. % and about 40 wt. % diamond. The cutting table may be between about 50 wt. % and about 90 wt. % tungsten carbide.

The cutting table may have a fracture toughness of at least 13 MPa*m^½. The heat-treatment has been shown to increase the fracture toughness by 1 to 2.5 MPa*m^½. This increase in fracture toughness does not appear to modify the abrasion resistance of the cutting surface of the cutting table. In some examples, the cutting surface has an abrasion resistance of at least 7 krev/cm$^3$ as assessed by ASTM B611.

Figure 2:
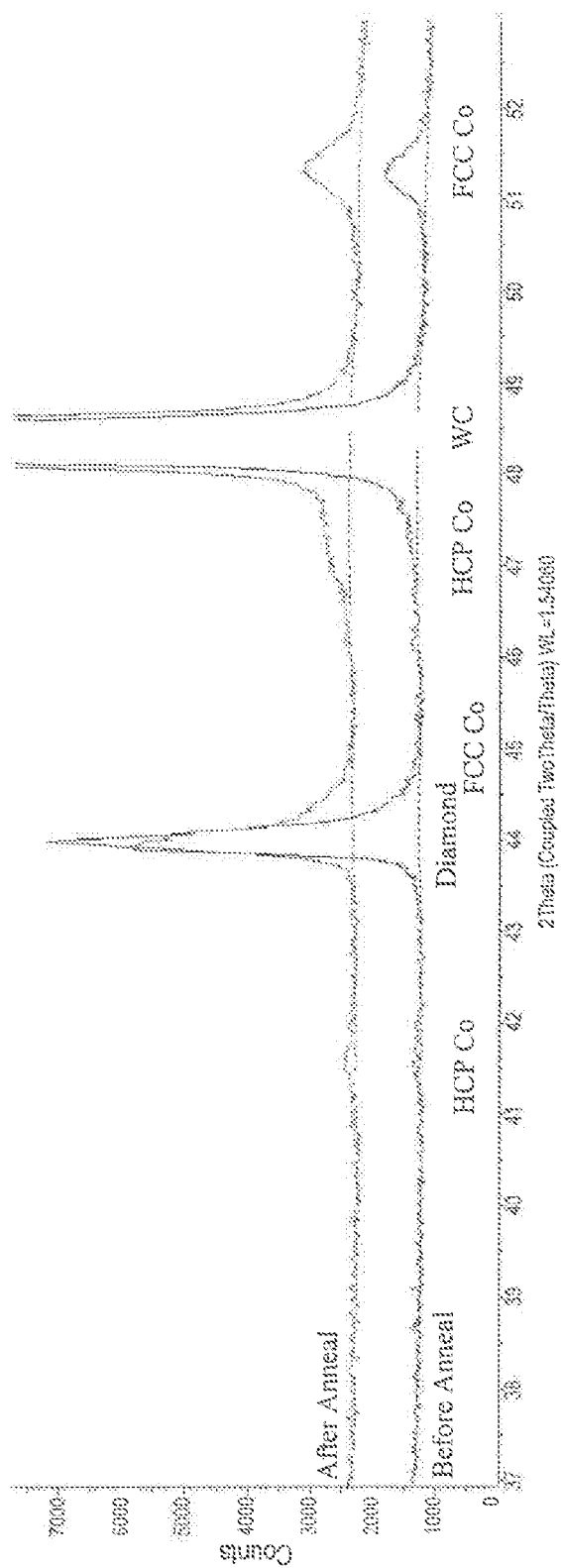
FIG. 2 shows two XRD spectra of material produced according to the described process, one before heat-treating and one after heat-treating, according to an embodiment consistent with this disclosure.

FIG. 2 shows two XRD spectra of material produced according to the described process, one before heat-treating (lower spectrum) and one after heat-treating (upper spectrum), according to an embodiment consistent with this disclosure. The after heat-treating curve has a number of diffraction peaks increase in relative intensity, including peaks at about 41.5 and 47.4 degrees 2-theta compared to before heat treatment. These peaks are consistent with a cobalt hexagonal close-packed (HCP) phase. Also observed was a slight shift in the cobalt face-centered cubic (FCC Co) peak at about 51.4 degrees 2-theta after heat-treatment (the rightmost peak). This shift in position of the FCC Co peak at about 51.4 degrees 2-theta suggests reduction in tungsten and/or carbon soluble species after heat-treatment. This reduction in soluble species also supports the increase in the cobalt HCP phase, as the soluble species act to suppress the formation of the cobalt HCP phase.

Figure 3:
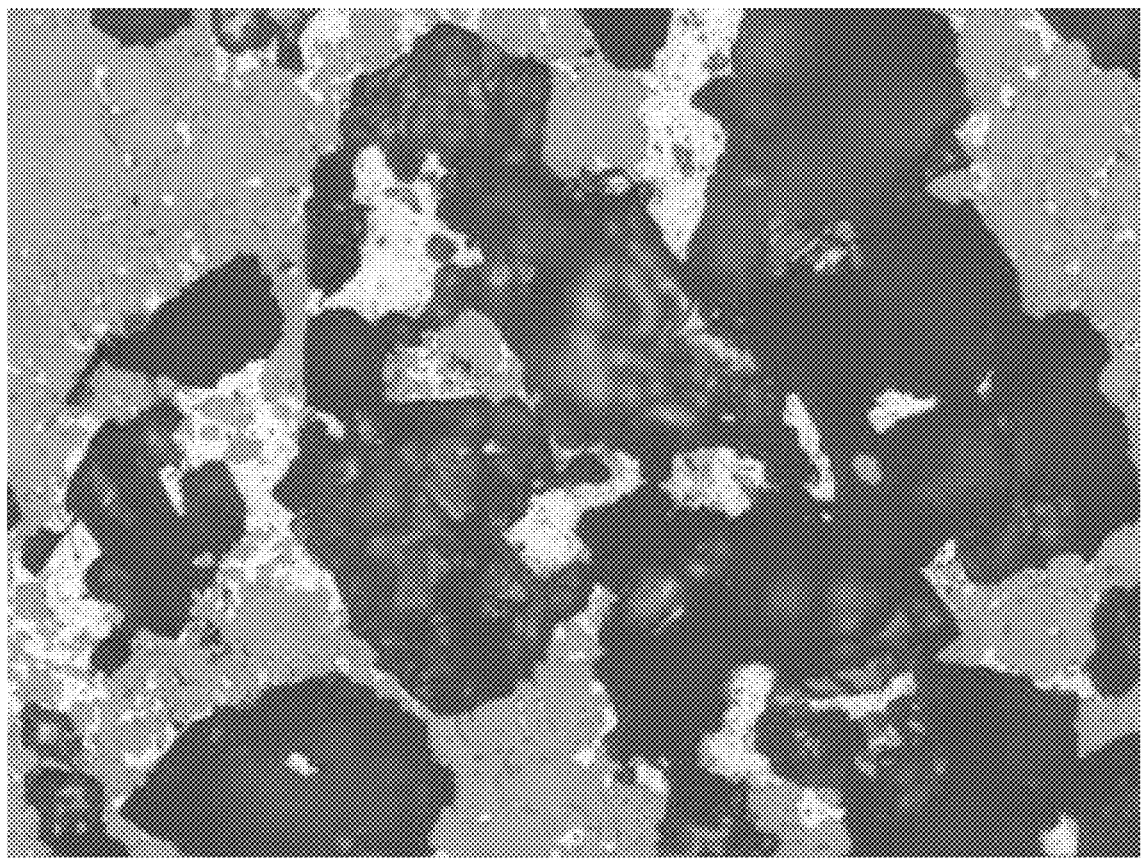
FIG. 3 is a microscopic view of a section of material according to this disclosure.

FIG. 3 shows a microscopic view of the grain structure of a compact of the disclosure after cooling but before heat-treatment. The grain structure consists of inter-bonded diamond particles, tungsten carbide particles, and a metallic cobalt matrix. The intermetallic phase is absent. Heat treatment shows no change in grain structure when viewed with an optical microscope or scanning electron microscope. The precipitated intermetallic phase is too fine to detect with such methods.

Magnetic properties of the compacts were evaluated before and after heat-treatment. All heat-treated samples showed a reduction in magnetic permeability of 30 to 80 in arbitrary units, consistent with an increase in coercivity. This is consistent with a reduction in magnetic domain size in the binder phase. Accordingly, there is secondary evidence of intermetallic phase precipitation.

Figure 4:
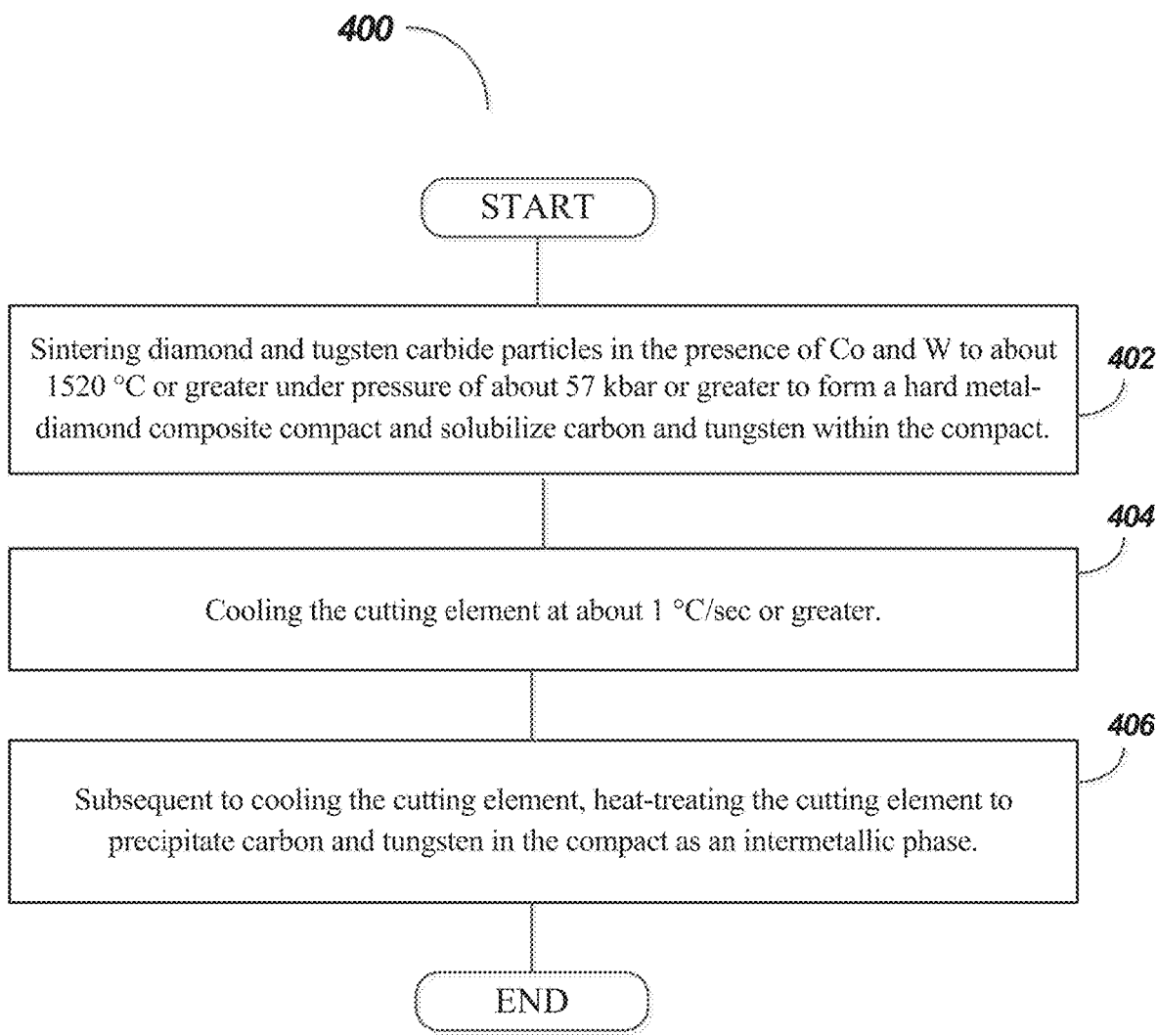
FIG. 4 describes a method of forming a cutting table of a cutting element according to an example of this disclosure.

FIG. 4 describes a method (400) of forming a cutting table of a cutting element. The method (400) includes: sintering (402) diamond and tungsten carbide particles in the presence of Co and W to about 1520° C. or greater under pressure of about 57 kbar or greater to form a hard metal-diamond composite compact and solubilize carbon and tungsten within the compact; cooling (404) the cutting element at about 1° C./sec or greater; and subsequent to cooling the cutting element, heat-treating (406) the cutting element to precipitate carbon and tungsten in the compact as an intermetallic phase.

The method (400) is a method of forming a cutting table of a cutting element. The described method (400) facilitates the formation of an intermetallic phase which increases the toughness of the cutting table. This higher toughness allows shapes which are not viable with less tough compositions. For example, the higher toughness allows conical shapes for the cutting element.

The method (400) includes sintering (402) diamond and tungsten carbide particles in the presence of Co and W to about 1520° C. or greater under pressure of about 57 kbar or greater to form a hard metal-diamond composite compact and solubilize carbon and tungsten within the compact. Heating at 1520° C. and above appears to allow additional solubilization of carbon and tungsten. In some examples, the temperature at about 1520° C. and above enables an additional 0.05-0.1 wt. % of W and 0.003-0.008 wt. % of C in the metal phase compared with similar melts at 1480° C. This higher concentration of tungsten and carbon facilitate formation of the intermetallic phase in the heat-treating process. The heating is conducted under pressure, for example, from about 57 kbar to about 70 kbar of pressure. The pressure facilitates stability of the diamond phase. In some embodiments, the cutting table is heated to no greater than 1700° C. In some embodiments, the cutting table is heated to no greater than 1600° C.

The method (400) further includes cooling (404) the cutting element at about 1° C./sec or greater. This rapid quench forms a supersaturated metal phase in the hard metal-diamond composite compact cutting table. In some embodiments, the cooling is performed at more than about 5° C./sec. For example, the cooling may be conducted at about 10° C./sec. The cooling may be conducted as passive cooling. In other examples, the cooling is regulated by a heater and/or a cooler to control the rate of cooling. The cooling may be performed until the cutting element is cooled to a temperature of about 200° C. or less. In some examples, high pressure is maintained on the cutting element during cooling within the HPHT press used to form the cutting table of the cutting element. For example, the pressure may be about 57 kbar or greater. The high-pressure cell may be heated via an electric circuit that provides an electric current to a resistance heater, e.g., a graphite resistance heater. The diamond composite material may be cooled by shutting off the electric power to the high pressure cell so that heat loss occurs through conduction to the surrounding cell material and anvils of the press.

The method (400) subsequent to cooling the cutting element, heat-treating (406) the cutting element to precipitate carbon and tungsten in the compact as an intermetallic phase. Heat-treating may be performed between 600° C. and 800° C. for at least 10 minutes. In some embodiments, the heat-treating is performed for over 30 minutes at no less than 600° C. In an embodiment, the heat-treating is performed at about 700° C. for at least 1 hour. The intermetallic phase may comprise $Co_3WC_x$, where $0 \leq x \leq 1$.

Figure 5:
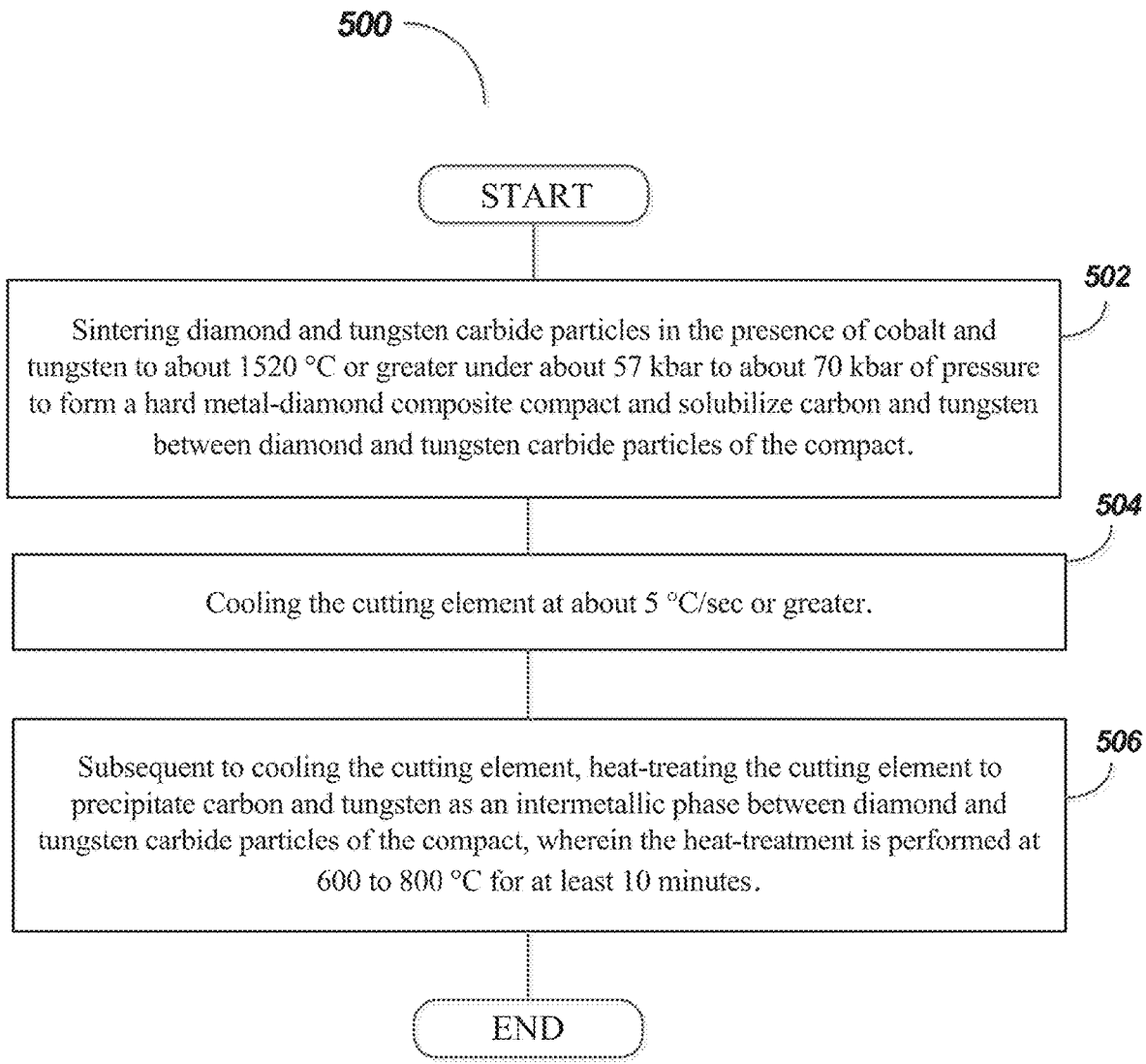
FIG. 5 describes a method of forming a cutting table of a cutting element according to an example of this disclosure.

FIG. 5 shows a flow chart for a more detailed method (500) of forming a cutting table of a cutting element. The method (500) including sintering (502) diamond and tungsten carbide particles in the presence of cobalt and tungsten to about 1520° C. or greater under about 57 kbar to about 70 kbar of pressure to form a hard metal-diamond composite compact and solubilize carbon and tungsten between diamond and tungsten carbide particles of the compact; cooling (504) the cutting element at about 5° C./sec or greater; and subsequent to cooling the cutting element, heat-treating (506) the cutting element to precipitate carbon and tungsten as an intermetallic phase between diamond and tungsten carbide particles of the compact, wherein the heat-treatment is performed at 600 to 800° C. for at least 10 minutes.

The method (500) includes sintering (502) diamond and tungsten carbide particles in the presence of cobalt and tungsten to about 1520° C. or greater under about 57 kbar to about 70 kbar of pressure to form a hard metal-diamond composite compact and solubilize carbon and tungsten between diamond and tungsten carbide particles of the compact. The heating to higher temperatures than are employed in conventional sintering allows for the solvation of carbon and tungsten into the metal phase.

The method (500) further includes cooling (504) the cutting element at about 5° C./sec or greater. In an example, the cutting element is cooled at about 10° C./sec. Rapid cooling traps the carbon and tungsten in the metal phase.

The method (500) includes, subsequent to cooling the cutting element, heat-treating (506) the cutting element to precipitate carbon and tungsten as an intermetallic phase between diamond and tungsten carbide particles of the compact, wherein the heat-treatment is performed at 600 to 800° C. for at least 10 minutes. In an example, the heat-treatment is performed for about 30 minutes at about 700° C. Heat-treatment allows for precipitation from the supersaturated metal phase in the compact. In some examples, the precipitated phase is present as an $\alpha'$ or $\epsilon'$ phase, e.g., an ordered version of the parent phase. The $\alpha'$ phase may be an ordered face centered cubic structure of the $Cu_3Au$ style (L1$_2$ Strukturbericht designation, Pm$\bar{3}$m space group). The E' phase may be ordered hexagonal close packed structure of the Ti$_3$Al type (D0$_{19}$ Strukturbericht designation, P6$_3$/mmc space group).

Embodiments of the disclosure may be particularly useful in providing a cutting element with improved characteristics of a cutting table, cutting edge and cutting surface that may result in a longer service life. Extending the life of the cutting elements may, in turn, extend the life of the earth-boring tool to which they are attached. Replacing earth-boring tools or even tripping out an earth-boring tool to replace worn or damaged cutters is a large expense for earth-boring operations. Often earth-boring tools are on a distal end of a drill string that can be in excess of 40,000 feet long. The entire drill string must be removed from the borehole to replace the earth-boring tool or damaged cutters. Extending the life of the earth-boring tool may result in significant cost savings for the operators of an earth-boring operation.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A cutting table for a cutting element, comprising:
   diamond particles;
   tungsten carbide particles;
   a cobalt-tungsten metallic matrix phase; and
   an intermetallic phase comprising Co$_3$WC$_x$, where 0<x≤1;
   wherein the intermetallic phase and the cobalt-tungsten metallic matrix phase are disposed in the interstitial spaces between the diamond particles and the tungsten carbide particles.

2. The cutting table of claim 1, wherein a cutting surface of the cutting table is configured as an insert for a roller cone earth boring tool.

3. The cutting table of claim 1, comprising between 3 wt. % and 15 wt. % cobalt.

4. The cutting table of claim 1, comprising between 5 wt. % and 40 wt. % diamond.

5. The cutting table of claim 1, comprising between 50 wt. % and 90 wt. % tungsten carbide.

6. The cutting table of claim 1, wherein the cutting table exhibits a fracture toughness of at least 13 MPa*m^½.

7. The cutting table of claim 1, wherein the intermetallic phase is a precipitated phase.

8. The cutting table of claim 1, wherein a cutting surface of the cutting table has an abrasion resistance of at least about 7,000 revolutions/cm$^3$ as assessed by ASTM B611.

9. The cutting table of claim 1, wherein the cobalt-tungsten-carbon metallic phase is a Face Centered Cubic (FCC) phase.

10. The cutting table of claim 1, wherein the cobalt-tungsten-carbon metallic phase is a Hexagonal Close-Packed (HCP) phase.

11. A method of manufacturing a cutting element, the method comprising:
   sintering diamond and tungsten carbide particles in the presence of Co and W to about 1520° C. or greater under pressure of about 57 kbar or greater to form a hard metal-diamond composite compact and solubilize carbon and tungsten within the compact;
   cooling the cutting element at about 1° C./sec or greater to form a cobalt-tungsten metallic phase in the compact; and
   subsequent to cooling the cutting element, heat-treating the cutting element to precipitate carbon and tungsten in the compact as an intermetallic phase comprising Co$_3$WC$_x$, where 0<x≤1.

12. The method of claim 11, wherein subsequent to cooling the cutting element, heat-treating the cutting element to precipitate carbon and tungsten as an intermetallic phase comprises heating treating the cutting element for at least about 30 minutes at no less than about 600° C.

13. The method of claim 11, wherein cooling the cutting element at about 1° C./sec or greater comprises cooling the cutting element at about 5° C./sec or greater.

14. The method of claim 11, wherein cooling the cutting element at about 1° C./sec or greater comprises cooling the cutting element to less than about 200° C.

15. The method of claim 11, wherein cooling the cutting element at about 1° C./sec or greater comprises maintaining sintering pressure on the cutting element during cooling.

16. The method of claim 11, wherein the pressure is between about 57 kbar and about 70 kbar.

17. A method of forming a cutting table of a cutting element comprising:
   sintering diamond and tungsten carbide particles in the presence of cobalt and tungsten to about 1520° C. or greater under about 57 kbar to about 70 kbar of pressure to form a hard metal-diamond composite compact and solubilize carbon and tungsten between diamond and tungsten carbide particles of the compact;
   cooling the cutting element at about 5° C./sec or greater to form a cobalt-tungsten metallic phase in the compact; and
   subsequent to cooling the cutting element, heat-treating the cutting element to precipitate carbon and tungsten as an intermetallic phase comprising Co$_3$WC$_x$, where 0<x≤1, between diamond and tungsten carbide particles of the compact, wherein the heat-treating is performed at 600 to 800° C. for at least 10 minutes.

18. The method of claim 17, wherein sintering to about 1520° C. or greater under about 57 kbar to about 70 kbar of pressure comprises heating the diamond and tungsten carbide particles, cobalt and tungsten to no more than about 1600° C.

19. The method of claim 17, wherein the heat-treating is performed at about 700° C. for at least about an hour.

20. The method of claim 17, wherein cooling the cutting element at about 5° C./sec or greater is performed at about 10° C./sec.

* * * * *